United States Patent
Gall et al.

(10) Patent No.: US 10,705,802 B2
(45) Date of Patent: Jul. 7, 2020

(54) EXTENSIBLE AND QUERYABLE STRONG TYPES

(71) Applicant: Microsoft Technology Licensing, LLC, Redmond, WA (US)

(72) Inventors: Michael Gall, Copenhagen (DK); Michael Fruergaard Pontoppidan, Copenhagen (DK); Henrik Jakobsen, Copenhagen (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 854 days.

(21) Appl. No.: 13/957,406

(22) Filed: Aug. 1, 2013

(65) Prior Publication Data

US 2014/0289199 A1    Sep. 25, 2014

Related U.S. Application Data

(60) Provisional application No. 61/803,538, filed on Mar. 20, 2013.

(51) Int. Cl.
  *G06F 8/20* (2018.01)
  *G06F 16/2453* (2019.01)
  *G06F 16/28* (2019.01)

(52) U.S. Cl.
  CPC .......... *G06F 8/24* (2013.01); *G06F 16/24549* (2019.01); *G06F 16/284* (2019.01)

(58) Field of Classification Search
  CPC ............. G06F 17/30607; G06F 16/284; G06F 16/24549
  See application file for complete search history.

(56) References Cited

U.S. PATENT DOCUMENTS

| | | | |
|---|---|---|---|
| 5,710,920 A | | 1/1998 | Maruyama et al. |
| 6,134,559 A | * | 10/2000 | Brumme ................. G06F 8/437 |
| 6,240,422 B1 | * | 5/2001 | Atkins et al. ................. 719/315 |
| 6,385,618 B1 | * | 5/2002 | Ng et al. |
| 6,854,120 B1 | | 2/2005 | Lo et al. |
| 7,680,767 B2 | | 3/2010 | Adya et al. |
| 7,853,961 B2 | | 12/2010 | Nori et al. |
| 8,365,140 B2 | | 1/2013 | Heyhoe et al. |

(Continued)

FOREIGN PATENT DOCUMENTS

| | | |
|---|---|---|
| WO | WO9503586 A1 | 2/1995 |
| WO | WO2005081668 A2 | 9/2005 |

OTHER PUBLICATIONS

S.Somasegar, Typescript: JavaScript Development at Application Scale, Oct. 1, 2012 (Year: 2012).*

(Continued)

*Primary Examiner* — Brittany N Allen
(74) *Attorney, Agent, or Firm* — Christopher J. Volkmann; Kelly, Holt & Christenson, PLLC

(57) ABSTRACT

Data type configuration data is expressed and deployed to a database system to obtain a relational representation of the data types in addition to the compile code representation. Users or developers extend the data types by adding data to the relational representation, and the runtime environment operates off of the relational representation. Because the data types are extended (such as by creating new entities) using the data type tables in the relational representation, the extensions obtain the benefits of the type checking performed at compile time.

20 Claims, 18 Drawing Sheets

(56) References Cited

U.S. PATENT DOCUMENTS

| | | | |
|---|---|---|---|
| 8,365,156 B2* | 1/2013 | Sollich | G06F 8/44 |
| | | | 717/143 |
| 9,507,820 B1* | 11/2016 | Hannah | G06F 17/30292 |
| 2004/0064348 A1 | 4/2004 | Humenansky et al. | |
| 2004/0177339 A1 | 9/2004 | Plaisted et al. | |
| 2004/0216094 A1* | 10/2004 | Bosworth | G06F 9/4488 |
| | | | 717/141 |
| 2008/0282057 A1* | 11/2008 | Layden et al. | 711/210 |
| 2009/0234804 A1* | 9/2009 | Whitechapel | G06F 9/449 |
| 2009/0248739 A1* | 10/2009 | Cao | G06F 17/30607 |
| 2009/0328017 A1 | 12/2009 | Larsen et al. | |
| 2012/0151411 A1 | 6/2012 | Schwartz et al. | |
| 2012/0180024 A1* | 7/2012 | Gonzalez | G06F 8/71 |
| | | | 717/109 |

OTHER PUBLICATIONS

Typing—HaskellWiki, last modified on Jan. 15, 2009 (Year: 2009).*
Dbms2, a Monash Research Publication, "Terminology: Dynamic vs fixed schema databases", Jul. 31, 2011 (Year: 2011).*
stackoverflow.com post, "what-is-the-difference-between-a-strongly-typed-language-and-a-statically-typed", asked Apr. 22, 2010, answers through Apr. 23, 2010 (Year: 2010).*
Borowian, Piotr, "Redesigning the Language for Business Logic in the Maconomy ERP System and Automatic Translation of Existing Code", Retrieved at <<www2.imm.dtu.dk/pubdb/views/edoc_download.php/6372/pdf/imm6372. pdf>>, A Master Thesis, DTU Informatics, Technical University of Denmark, Retrieved date: May 17, 2013, pp. 104.
International Preliminary Report on Patentability for International Application No. PCT/US2014/031150, dated May 28, 2015, date of filing: Mar. 19, 2014, 7 pages.
Second Written Opinion for International Application No. PCT/US2014/031150 dated Mar. 3, 2015, date of filing: Mar. 19, 2014, 6 pages.
Search Report and Written Opinion for International Application No. PCT/US2014/031150, dated Jul. 8, 2014. 9 pages.

* cited by examiner

236

//This method is auto generated and cannot be edited.
[EditorReadOnlyAttribute]
Protected final sysDomainModelDeployVersion deployVersion( )
{
    return 212840245;
}

100% classDeclaration
metadata
deployVersion
initialize

238

Overridden method – regular strongly typed OO style:

FIG. 2B

```
SQLQuery1.sql...ROPE\mfp (64))
/****** Script for Select TopNRows  command from SSMS  ******/
SELECT TOP 1000 [DEPLOYVERSION]
      ,[DESCRIPTION]
      ,[IDENTIFIER]
      ,[ISIMMUTABLE]
      ,[NAME]
      ,[RECVERSION]
      ,[PARTITION]
      ,[RECID]
  FROM [AXDBDEV].[dbo].[DOMAINEVENTACTIVITYDATATYPE]
```

Results | Messages

| # | DEPLOYVERSION | DESCRIPTION | IDENTIFIER | ISIMMUTABLE | NAME | RECVERSION | PARTITION | RECID |
|---|---|---|---|---|---|---|---|---|
| 1 | 1478129905 | Cash settlement request receipt recognition act... | DomEventActCashSettleReqReceiptRecog... | 1 | Cash settlement request receipt recognition | 1 | 5637144576 | 5637144576 |
| 2 | 70590276 | Ledger event recognition activity | DomEventActLedgerEventRecognition | 1 | Ledger event recognition | 1 | 5637144576 | 5637144577 |
| 3 | 2091866317 | Product receipt recognition activity | DomEventActProdReceiptRecognition | 1 | Product receipt recognition | 1 | 5637144576 | 5637144578 |
| 4 | 985990064 | Product delivery activity | DomEventActProductDelivery | 1 | Product delivery | 1 | 5637144576 | 5637144579 |
| 5 | 596274354 | Product receipt activity | DomEventActProductReceipt | 1 | Product receipt | 1 | 5637144576 | 5637144580 |
| 6 | 41332340 | Product receipt documentation activity | DomEventActProductReceiptDoc | 1 | Product receipt documentation | 1 | 5637144576 | 5637144581 |
| 7 | 212840245 | Purchase activity | DomEventActPurchase | 1 | Purchase | 1 | 5637144576 | 5637144582 |
| 8 | 1495497329 | Purchase documentation activity | DomEventActPurchaseDoc | 1 | Purchase documentation | 1 | 5637144576 | 5637144583 |
| 9 | 1218149153 | Purchase recognition activity | DomEventActPurchRecognition | 1 | Purchase recognition | 1 | 5637144576 | 5637144584 |
| 10 | 89376092 | Settlement activity | DomEventActSettlement | 1 | Settlement | 1 | 5637144576 | 5637144585 |
| 11 | 99909047 | Cash settlement request receipt activity | DomEventActSettlementReqReceipt | 1 | Cash settlement request receipt | 1 | 5637144576 | 5637144586 |
| 12 | 854138603 | Cash settlement request receipt documentation a... | DomEventActSettlementReqRReceiptDoc | 1 | Cash settlement request receipt documentation | 1 | 5637144576 | 5637144587 |
| 13 | 2015665678 | Cash settlement request receipt receipt activity | DomEventActSettleReqOnProdReceipt | 1 | Cash settlement request on product receipt | 1 | 5637144576 | 5637144588 |
| 14 | 1983859927 | Cash settlement request receipt recognition ac... | DomEventActSettleReqOnProdReceiptRecog. | 1 | Cash settlement request receipt recognition on p... | 1 | 5637144576 | 5637144589 |

Query executed successfully.    mfp-v1 (10.0 SP3) | EUROPEMFP (64) | master | 00:00:00 | 15 rows

FIG. 5A

EXTENSIBLE AND QUERYABLE STRONG TYPES

The present application is based on and claims the benefit of U.S. provisional patent application Ser. No. 61/803,538, filed Mar. 20, 2013, the content of which is hereby incorporated by reference in its entirety.

BACKGROUND

Data systems are currently in wide use. Data systems are often developed by a developer and used by an end user. The developer often defines the data types in the data system and the user simply uses them. However, an end user may also wish to define a new or different data type. This has presented some difficulties.

One example of a data system is a business data system. A business data system can include, for example, an enterprise resource planning (ERP) system, a customer resource management (CRM) system, a line-of-business (LOB) system, or other systems. In such business data systems, the developer often configures the business data system by defining data types and authoring code against the defined data types in the compiled code. This results in strongly typed data entities, defined as classes, with full object orientation and tooling support. For instance, the type system of the compiler will catch data type errors at compile time, so that they do not occur at runtime. In this type of system, however, if an end user wishes to extend a data type or create a new data type, the user often needs to have the developer perform this work and then recompile the code. This can be a great deal more costly and time consuming than simply allowing an end user to make these changes.

Some systems currently allow end users to define data types. However, these are weakly typed data types in that they are often simply referenced using a string. Errors in this kind of system are not even detected at compile time. Therefore, this can result in runtime errors. That is, the developers had to write data manipulation (DML) statements to create the types and the code can only reference these weakly typed entities by name. Thus, the compiler is unable to detect any type mistakes.

The discussion above is merely provided for general background information and is not intended to be used as an aid in determining the scope of the claimed subject matter.

SUMMARY

Data type configuration data is expressed and deployed to a database system to obtain a relational representation of the data types in addition to the compiled code representation. Users or developers extend the data types by adding data to the relational representation, and the runtime environment operates off of the relational representation. Because the data types are extended (such as by creating new entities) using the data type tables in the relational representation, the extensions obtain the benefits of the type checking performed at compile time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 2A-2D are illustrative user interface displays.

FIG. 5A is one illustrative user interface display.

DETAILED DESCRIPTION

Figure 1:
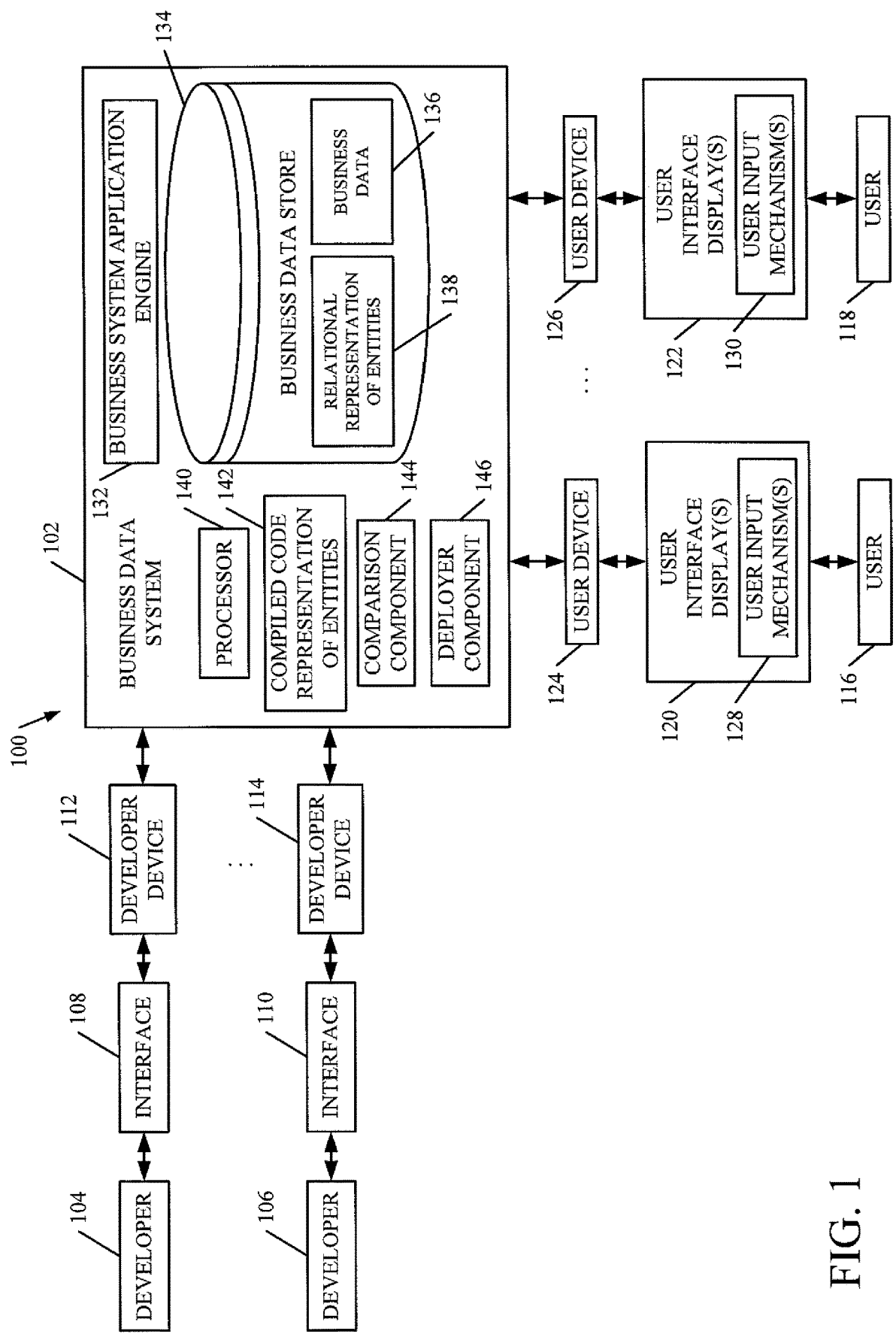
FIG. 1 is a block diagram of one illustrative business data architecture.

FIG. 1 is a block diagram of one embodiment of a business data system architecture 100. Architecture 100 includes business data system 102 that is accessed by a plurality of developers 104 and 106 through interfaces 108 and 110, respectively, and developer devices 112 and 114. Business data system 102 is also shown as being accessible by users 116 and 118 through user interface displays 120 and 122, respectively, and user devices 124 and 126.

User interface displays 120 and 122 illustratively include user input mechanisms 128 and 130, respectively, that receive user inputs to manipulate and control business data system 102. Similarly, interfaces 108 and 110 illustratively have input mechanisms for receiving inputs from developers 104 and 106 to perform development tasks with respect to business data system 102. The input mechanisms can illustratively be any of a wide variety of different types of mechanism, such as dropdown menus, text boxes, icons, links, buttons, or other user actuable input mechanisms. In addition, they can illustratively be actuated in a wide variety of different ways. By way of example, they can be actuated using a pointing device (such as a mouse or track ball), using a soft or hardware keyboard, a keypad, a thumb pad, a joystick, other buttons, etc. Similarly, where the devices on which the user input mechanisms are deployed have speech recognition components, the input mechanisms can be actuated using voice commands. Similarly, where the interface displays are displayed on a touch sensitive screen, the input mechanisms can be actuated using touch gestures (such as with the user's finger, a stylus, etc.).

In any case, business data system 102 is shown with a business data system application engine 132 that runs a business data application at runtime and a business data store 134. Business data store 134, itself, includes business data 136 and relational representations of various entities 138. Business data system 102 also illustratively includes processor 140, compiled code representation of entities 142, comparison component 144 and deployer component 146.

Business system application engine 132 can run any of a wide variety of different business system applications (such as an ERP system, a CRM system, an LOB system, etc.). It illustratively accesses, and acts upon, the data in business data store 134 to provide functionality to users 116 and 118. While business system application engine 132 is shown in business data system 102, and is accessible directly through user devices 124 and 126, it can also be deployed in a multi-tenant data center that hosts different instances of the business system application or business data 134, or both, for a plurality of different tenants. In such an embodiment, each tenant is illustratively associated with a different organization. The business data associated with each organization is illustratively deployed in an un-shared business data store maintained by a database server instance. Of course, the business system application engine 132 can also run an on-premise version of the application as well. The present discussion contemplates all of these and other architectures.

Processor 140 is illustratively a computer processor with associated memory and timing circuitry (not separately shown). It is illustratively a functional part of business data system 102 and is activated by, and facilitates the functionality of, the other items in business data system 102. In addition, it will be noted that each device 112, 114, 124 and 126 can have one or more processors as well, which are functional components of those devices and facilitate the functionality of various items on those devices.

It will also be noted that, while FIG. 1 shows business data store 134 as being local to business data system 102, it can be remote from business data system 102 as well. Similarly, where single data store 134 is shown, multiple data stores can be used as well. Some can be local and others can be remote from system 102, or they can be deployed in other ways as well. In addition, while multiple blocks are shown in the block diagram of FIG. 1, the functionality of two or more blocks can be combined into a single functional block as well. In addition, the functionality of a single block can be divided into more functional blocks, but those shown are shown for the sake of example only.

Before describing the operation of architecture 100 in more detail, an overview will be provided for the sake of clarity. One or more of developers 104-106 first develop the code used as business application system 132, along with its metadata. In doing so, the developers define data types and entities. The code is then compiled to obtain a compiled code representation of the data types and entities indicated by 142 in FIG. 1. In addition, a relational representation of the entities 138 is generated and stored in data store 134. The business system application engine 132 runs on the relational representation of the entities 138. One or more of the end users 116-118 can thus extend the data types or entities in relational representation 138 by simply adding metadata to the tables that represent the entities or data types. Comparison component 144, during runtime, invokes a method that compares the version of the compiled code representation 142 to the version of the relational representation 138 to determine whether they need to be synchronized. If so, deployer component 146 deploys metadata to the relational representation 138 in order to synchronize the two representations. In this way, even the extensions to the entities generated in relational representation 138 obtain the strongly typed benefit of the compiled code representation of the entities 142. Thus, while end users can extend the entities and data types, they do not suffer the drawback of having only weakly-typed data type extensions.

Figure 2:
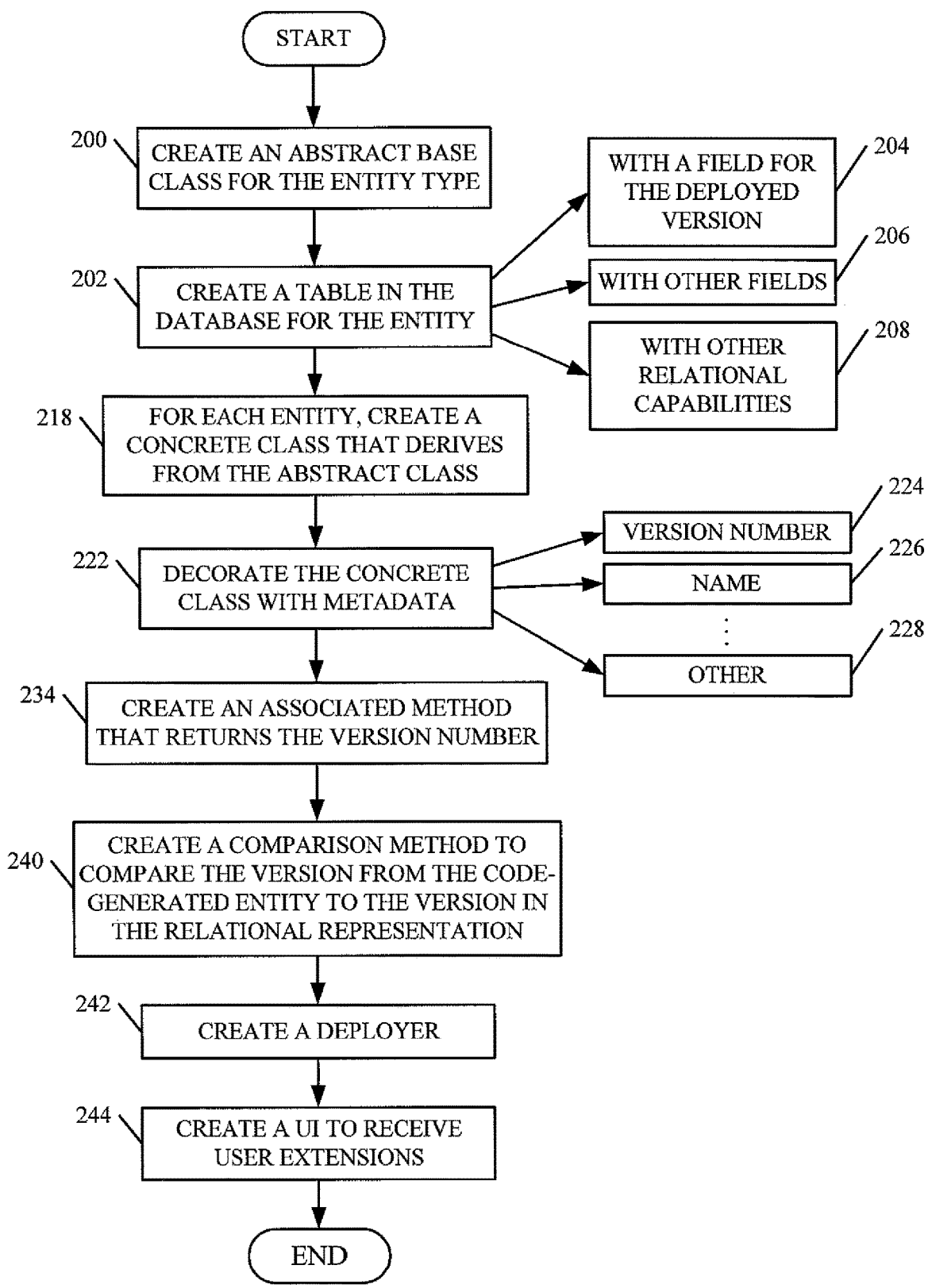
FIG. 2 is a flow diagram illustrating one embodiment of the operation of the architecture shown in FIG. 1 in setting up extensible entities.

FIG. 2 is a flow diagram illustrating one embodiment of the operation of architecture 100 in creating the database (or relational) representations of the entities 138. In one embodiment, a developer (such as developer 104) first creates an abstract base class for a given entity type. This is indicated by block 200 in FIG. 2. For purposes of the present example, the entity type will be named "Entity".

Next, developer 104 creates a table for the entity in business data store 134. In the present example, the table is named "EntityDataType". The table has a field named deployed version as well as a field for each class property that is defined below. The "name" property, is an example. Creating the table in the database is indicated by block 202 in FIG. 2, and creating it with a field for the deployed version is indicated by block 204 and the other fields are indicated by block 206. It will be noted, of course, that the table can also include other relational capabilities 208. For example, it can include indices, relations, date effectively, etc.

Figure 3:
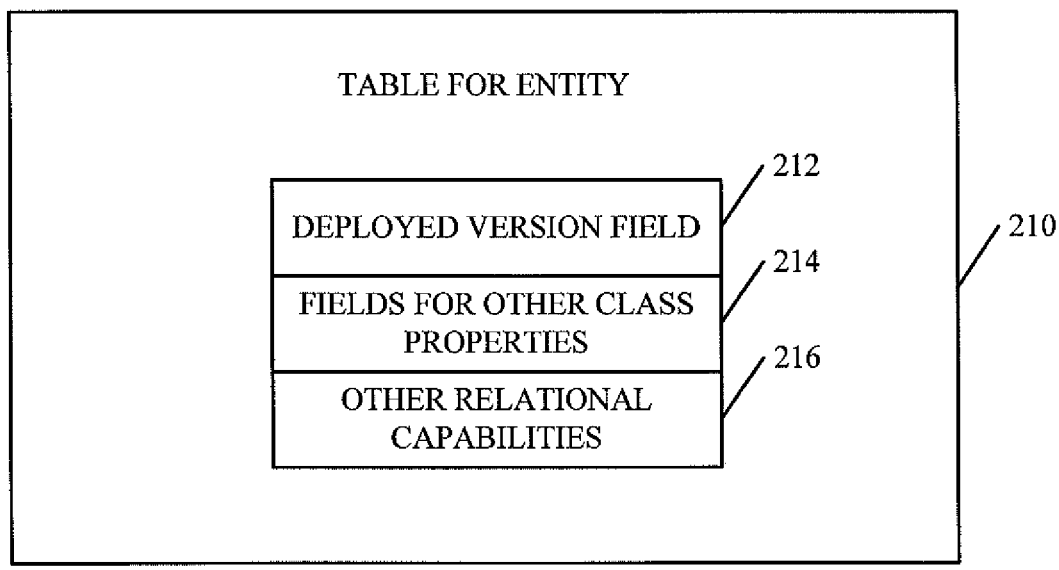
FIG. 3 is a representation of a table and metadata.
Figure 3:
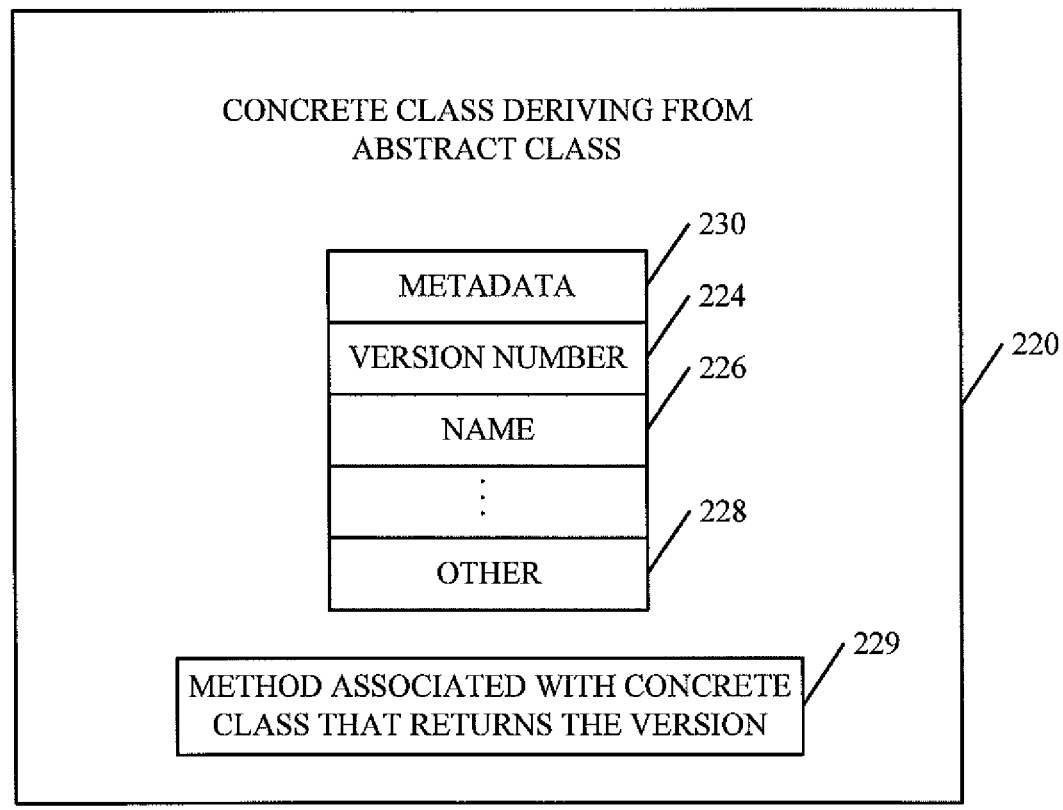

FIG. 3 shows one simplified embodiment of a table 210. The table 210 is for the entity type name of an abstract class named Entity. It has a field 212 for a deployed version, fields 214 for other class properties, and the other relational capabilities 216.

For each entity, a new class (a concrete class) is created that derives from the abstract class defined in block 200. This is indicated by block 218 in FIG. 2. FIG. 3 also shows one embodiment of the concrete class 220 with metadata 230 and an associated method 229 that is described below.

Once the concrete class is created, it is decorated with metadata that includes a version number. This is indicated by block 222 in FIG. 2. The version number is indicated by block 224, and the metadata can, of course, include other things as well, such as a name 226, or other metadata 228.

Figure 2A:
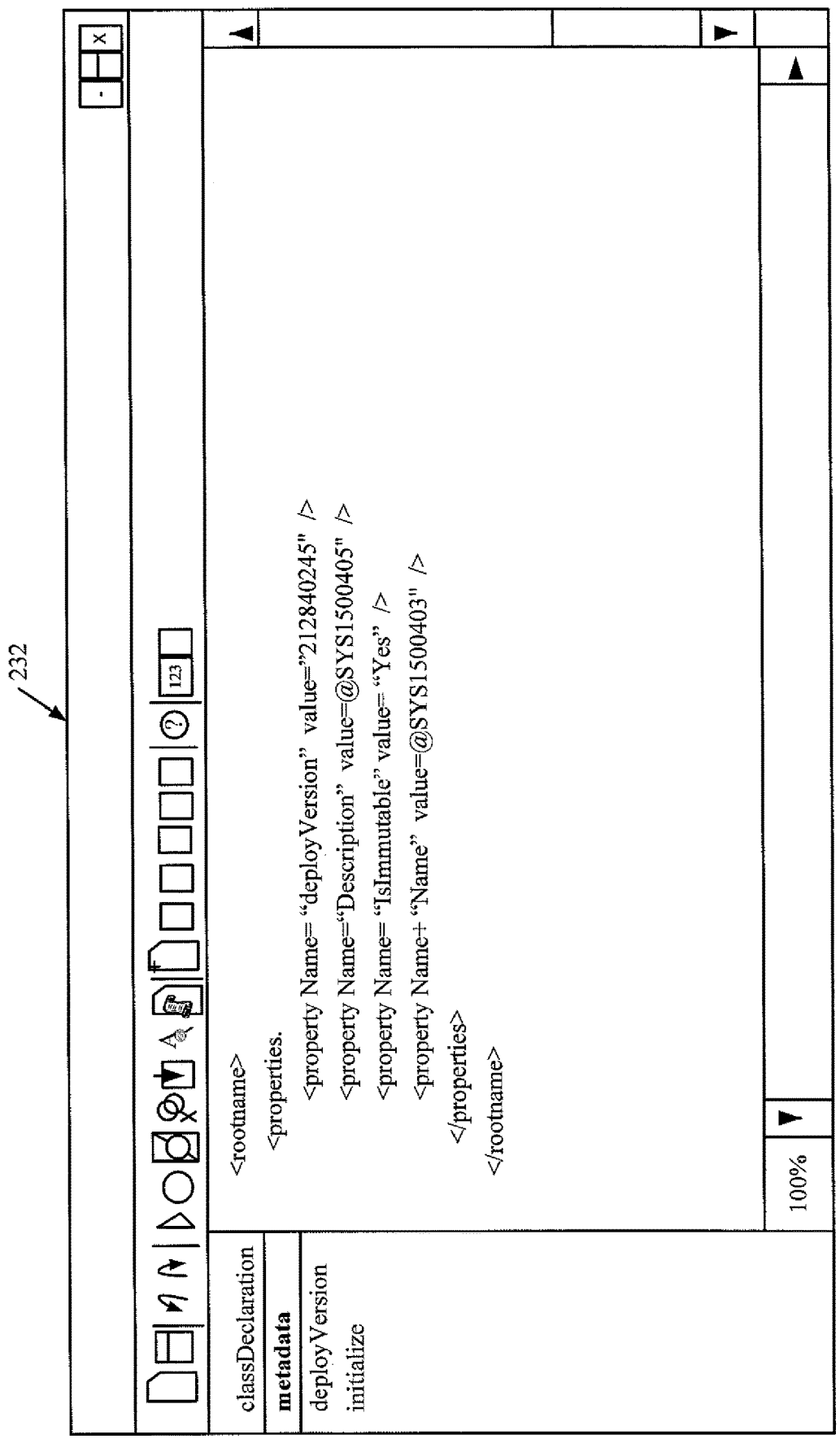
Figure 2C:
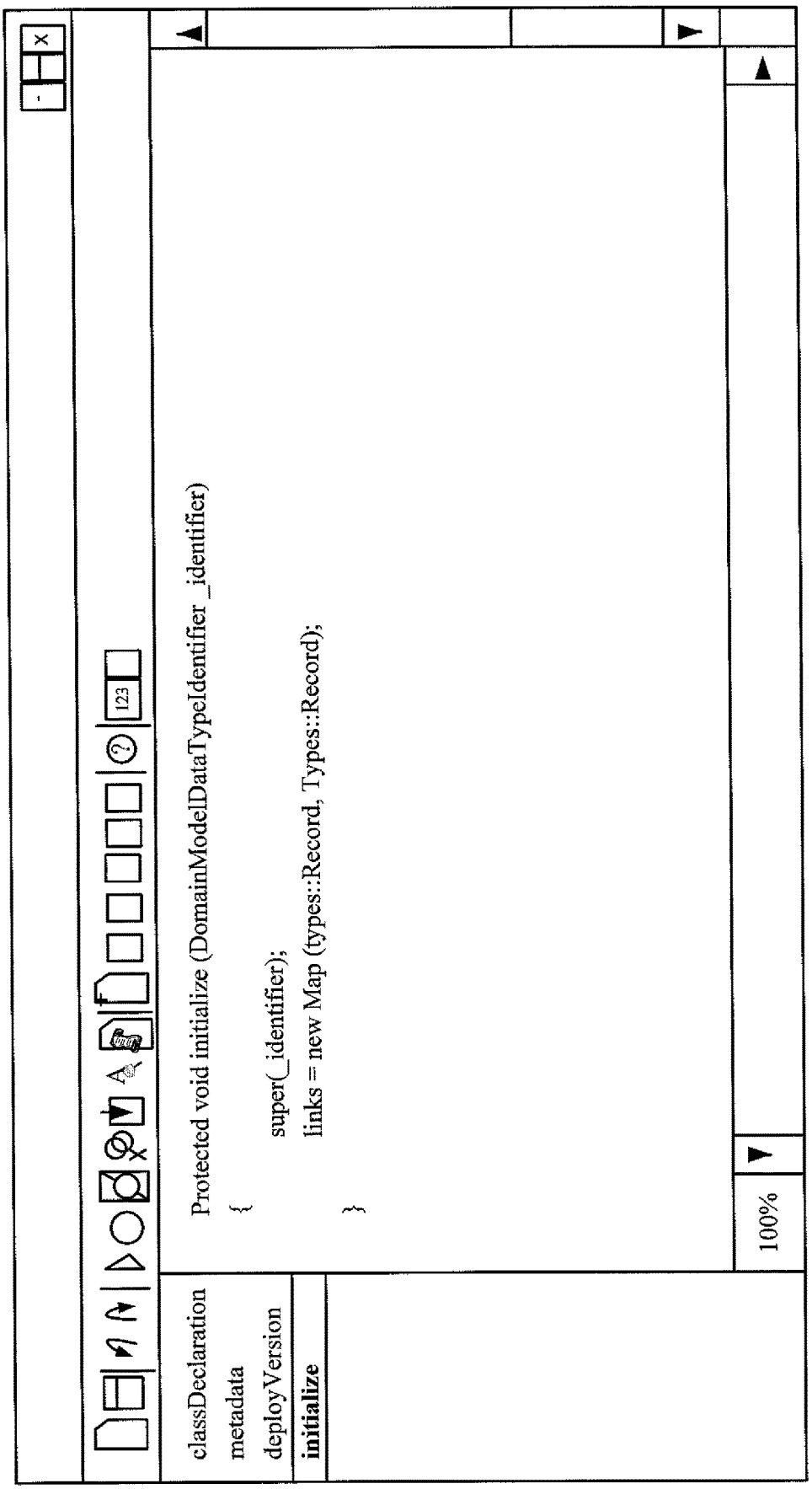

FIG. 2A shows one embodiment of a user interface display 232 that can be used by a developer to view, add or delete metadata from the concrete class. It can be seen that the metadata in user interface display 232 includes a deploy version, a description, is immutable, and a name. The Immutable piece of metadata determines that the end user cannot edit this item of metadata, but it is read only for the end user.

Developer 104 then creates an associated method that returns the version number. This is indicated by block 234 in FIG. 2. FIG. 2B shows one embodiment of a user interface display 236 that can be viewed by the developer. When the developer clicks the deploy version button 238, the method shown in user interface 236 is displayed. It can be seen that the method returns the version number from the deploy version metadata when the method is called. In one embodiment, the deploy version method is called only once, every time the metadata is changed. In a runtime environment, this is a very limited number of times. In addition, it is called automatically. The code generated method is compiled, meaning that there is virtually no overhead in performing the validation as to whether the relational presentation and the compiled code representation are in sync.

After the method that returns the version number is created by developer 104, developer 104 creates a comparison method to compare the version number from the code-generated entity 142 to the version in the relational representation of the entity 138. This is indicated by block 240 in FIG. 2. This method is illustratively called by comparison component 144 when the application tries to instantiate a concrete type of the class. The method compares the two versions. If they are the same, processing simply continues. If not, however, the metadata is redeployed to the database to make the two representations synchronous with one another.

The following is one illustrative embodiment of the runtime method that compares the two version numbers.

```
public Entity newFromType (EntityDataType    _entityDataType)
{
    EntityFactory entityFactory = EntityFactory::newFromEntityDataType
    (_entityDataType) ;
    Entity entity = entityFactory.createInstance ( ) ;
    Int64 metaDataVersion = entity.metadataVersion ( ) ;
    if (metaDataVersion &&
        metaDataVersion != _entityDataType.DeployedVersion)
    {
        EntityDeployer::newFromEntity (entity).deploy ( ) ;
        return Entity::newFromName (_entityDataType.Name) ;
    }
    return entity;
}
```

The developer 104 then creates a deployer. This is indicated by block 242 in FIG. 2. The deployer is represented by component 146 in FIG. 1 and is called by the method described above. When two version numbers are not the same. The deployer then reads the metadata and inserts or updates rows in the relational representation of entities 138 (the table created above at step 202) with the new or modified metadata.

Developer 102 then optionally creates a user interface display that can be displayed to end users 116-118 to receive user extensions of the data types or entities. This is indicated by block 244. This is described in greater detail below with respect to FIG. 4A.

Figure 2D:
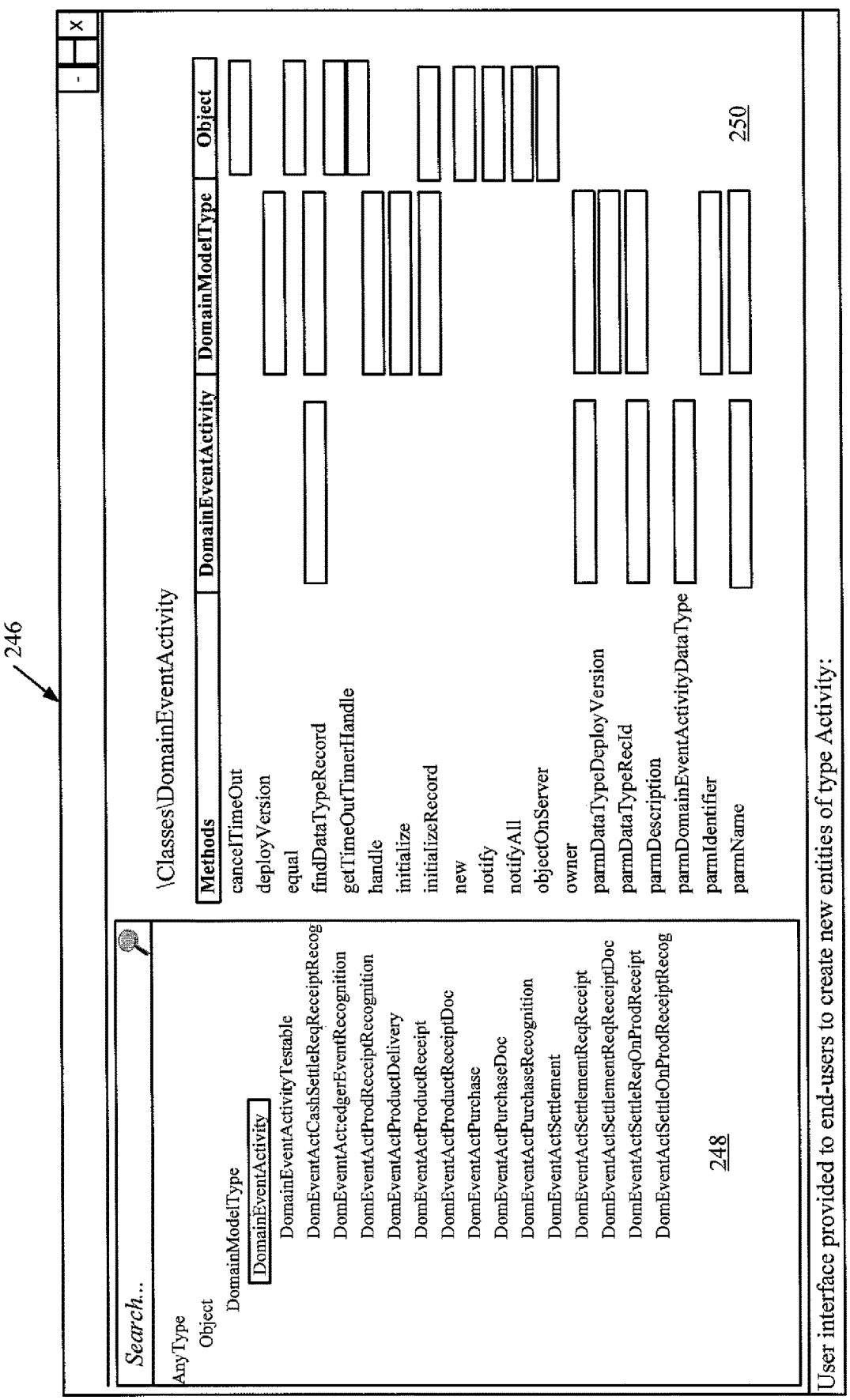

It should be noted that developer 104 can also easily view all entities of any entity type that have been defined. FIG. 2D shows one example of a user interface display 246 that illustrates this. In user interface display 246, a developer has accessed the type hierarchy browser and is looking at entities of type Activity that have been defined. When the user highlights one of the types in pane 248, the details of the highlighted type are shown in pane 250 of user interface display 246.

Figure 4:
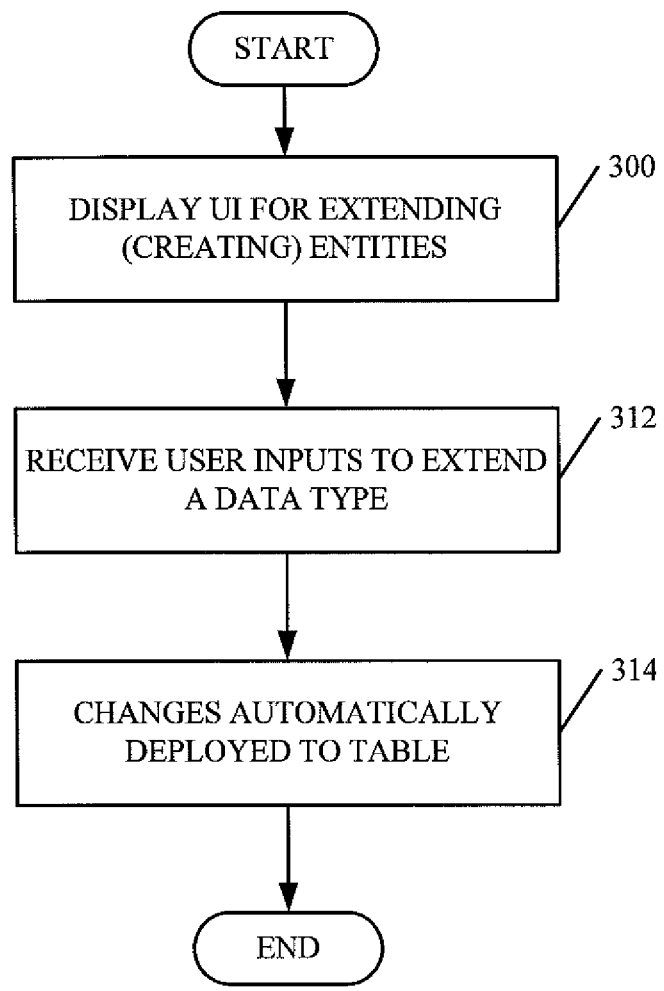
FIG. 4 is a flow diagram illustrating one embodiment of the operation of the architecture shown in FIG. 1 in enabling user extensions to an entity or data type.
Figure 4A:
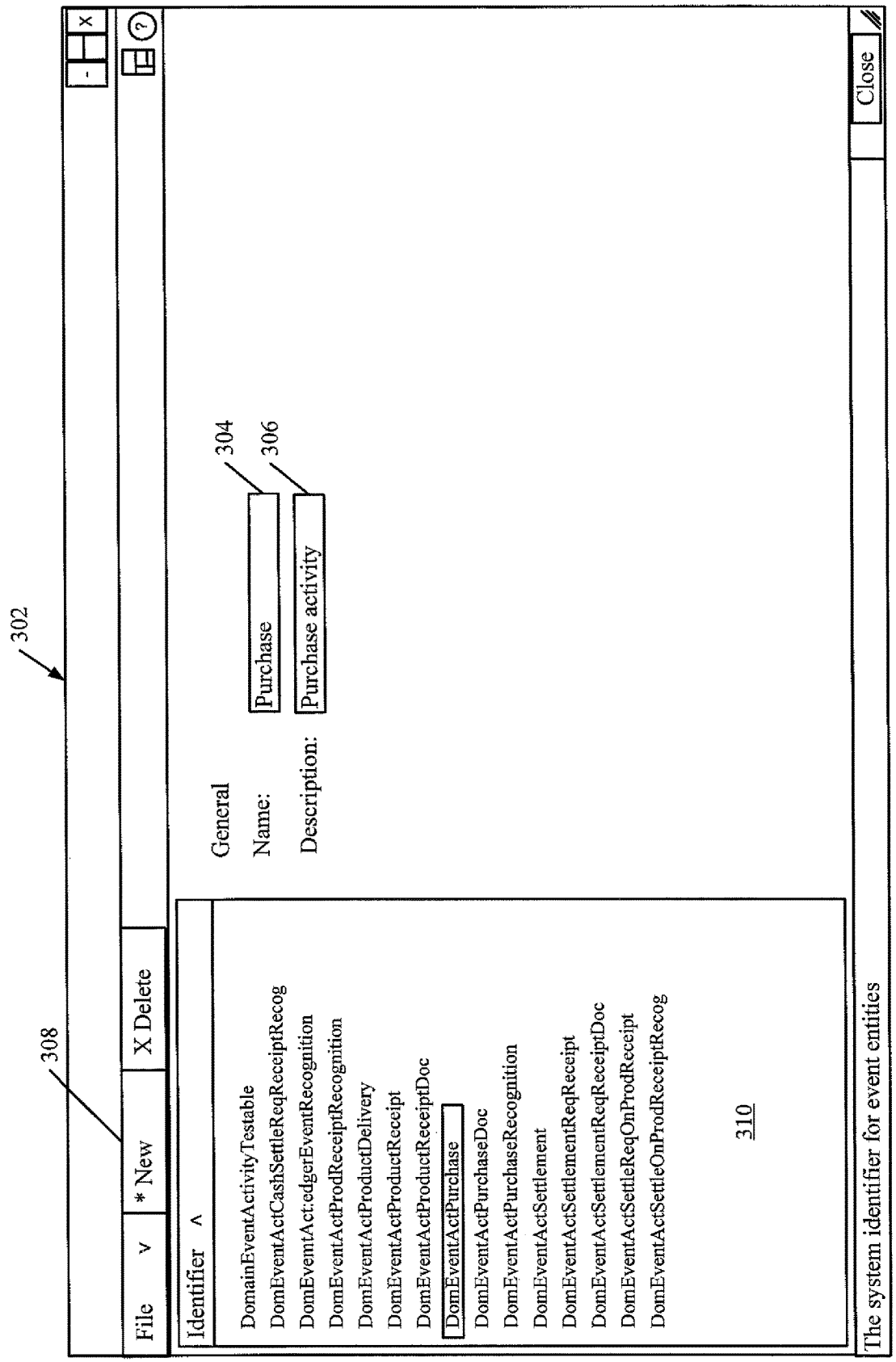
FIG. 4A is one illustrative user interface display.

FIG. 4 is a flow diagram showing one embodiment of the operation of the architecture 100 shown in FIG. 1 in receiving user inputs for extending or creating entities. First, a user interface component on business data system 102 or user device 124 (where user 116 is extending the entities) generates a user interface display 120 for receiving user inputs (such as through user input mechanisms 128) to extend or create entities. This is indicated by block 300 in FIG. 4. FIG. 4A shows one embodiment of a user interface display for doing this. It can be seen that the user is in the event domain for Activity. The user can input information (such as through text boxes 304 and 306) to name and describe an entity. Of course, the user can generate a new entity by actuating the New button 308, in which case the user can provide additional information about the new entity as well. It can be seen that the structure in pane 310 is updated to show any new entities created by user 116.

Receiving the user inputs to extend a data type or entity is indicated by block 312, and automatically deploying changes to the table (the relational representation of entities 138) in business data store 134 is indicated by block 314.

Figure 5:
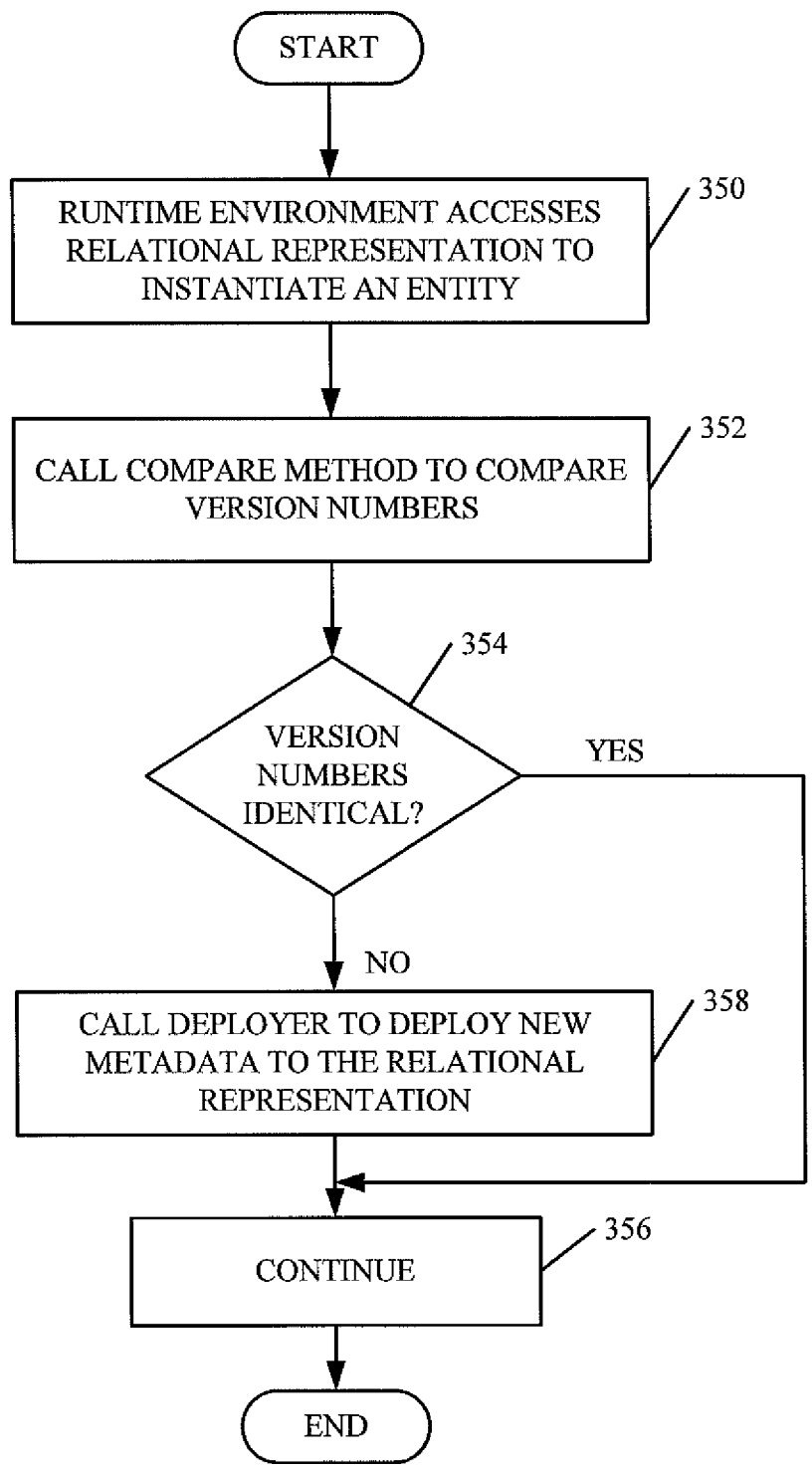
FIG. 5 is a flow diagram illustrating one embodiment of a runtime operation of the architecture shown in FIG. 1 in ensuring that the code-generated representation of an entity and a relational representation of the entity are synchronized.

FIG. 5 is a flow diagram illustrating one embodiment of the architecture 100 shown in FIG. 1 in synchronizing the two representations of a given entity. The runtime environment or engine 132 that runs the business system application first receives an input that requests access to a given entity.

The runtime environment (engine 132) then accesses the relational representation 138 in order to instantiate the given entity. This is indicated by block 350 in FIG. 5. The runtime environment then calls comparison component 144 to execute the method to compare the version numbers of the representations of the entities (the compiled code representation 142 and the relational representation 138). This is indicated by block 352. If the version numbers are identical (as determined at block 354) then processing simply continues in the normal runtime fashion, as directed by business system application 132. This is indicated by block 356.

However, if, at block 354, it is determined that the two version numbers are not identical, then the runtime environment calls deployer component 146 to deploy the new metadata to the relational representation 138 in order to ensure that the two are synchronized This is indicated by block 358 in FIG. 5.

FIG. 5A is one embodiment of a user interface display 370. User interface display 370 shows a view of the relational representation 138 in data store 134. Therefore, the various entities of a given type can easily be reviewed using a user interface display, such as display 370 of FIG. 5A.

It can thus be seen that the runtime environment operates only off the relational representation of the entities 138. However, one or more developers can create entities using strongly typed entities, so that the type system will detect type errors at compile time. The metadata defining the entities is then copied to the relational representation 138 in the database 134. Therefore, users 116-118 can create new entities or extend the classes that are defined in the relational representation 138 by simply adding additional information to the tables in relational representation 138 (such as by adding additional columns, fields, etc.). In that way, the new entities maintain the benefit of the strongly typed definitions generated by the developers, but they can be made by the end users, without developer involvement.

Figure 6:
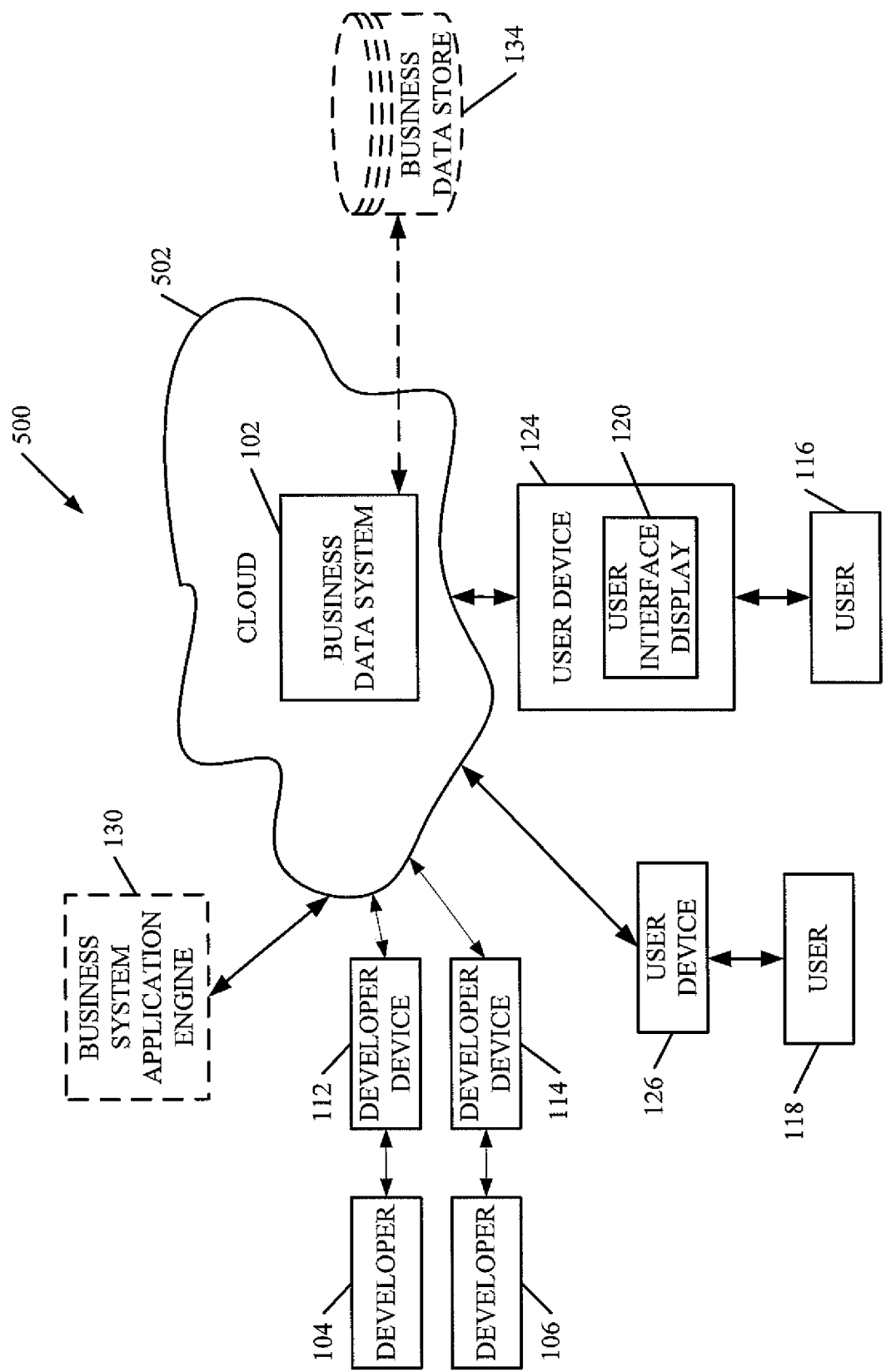
FIG. 6 shows the elements of the architecture of FIG. 1 deployed in various other architectures.

FIG. 6 is a block diagram of architecture 100, shown in FIG. 1, except that it's elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 5, some items are similar to those shown in FIG. 1 and they are similarly numbered. FIG. 5 specifically shows that business data system 102 is located in cloud 502 (which can be public, private, or a combination where portions are public while others are private). Therefore, user 116 uses a user device 124 that to access those systems through cloud 502.

FIG. 5 also depicts another embodiment of a cloud architecture. FIG. 5 shows that it is also contemplated that some elements of business data system 102 are disposed in cloud 502 while others are not. By way of example, data store 134 can be disposed outside of cloud 502, and accessed through cloud 502. In another embodiment, business system application engine is also outside of cloud 502. Regardless of where they are located, they can be accessed directly by device 124, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
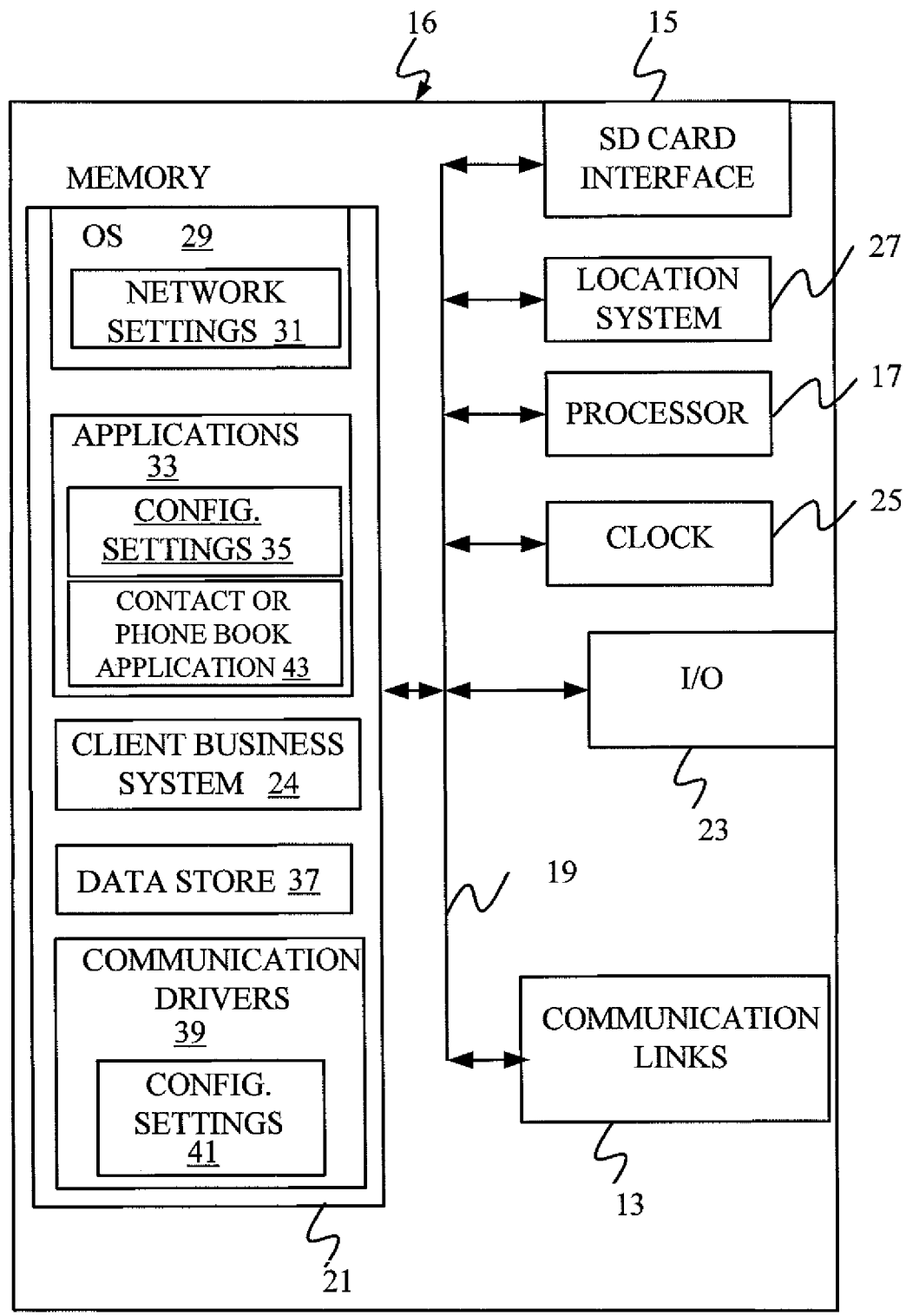
FIGS. 7-11 illustrate various mobile devices.

FIG. 7 is a simplified block diagram of one illustrative embodiment of a handheld or mobile computing device that can be used as a user's or client's hand held device 16, in which the present system (or parts of it) can be deployed. FIGS. 8-11 are examples of handheld or mobile devices.

FIG. 7 provides a general block diagram of the components of a client device 16 that can run components of business data system 102 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like an on-premise business application) are received on a removable Secure Digital (SD) card that is connected to a SD card interface 15. SD card interface 15 and communication links 13 communicate with a processor 17 (which can also embody processors 140 or other processors described with respect to FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Business data 136, the business application or the items in data store 134, for example, can reside in memory 21. Similarly, device 16 can have a client business system 24 which can run various business applications or embody parts or all of system 102. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 8:
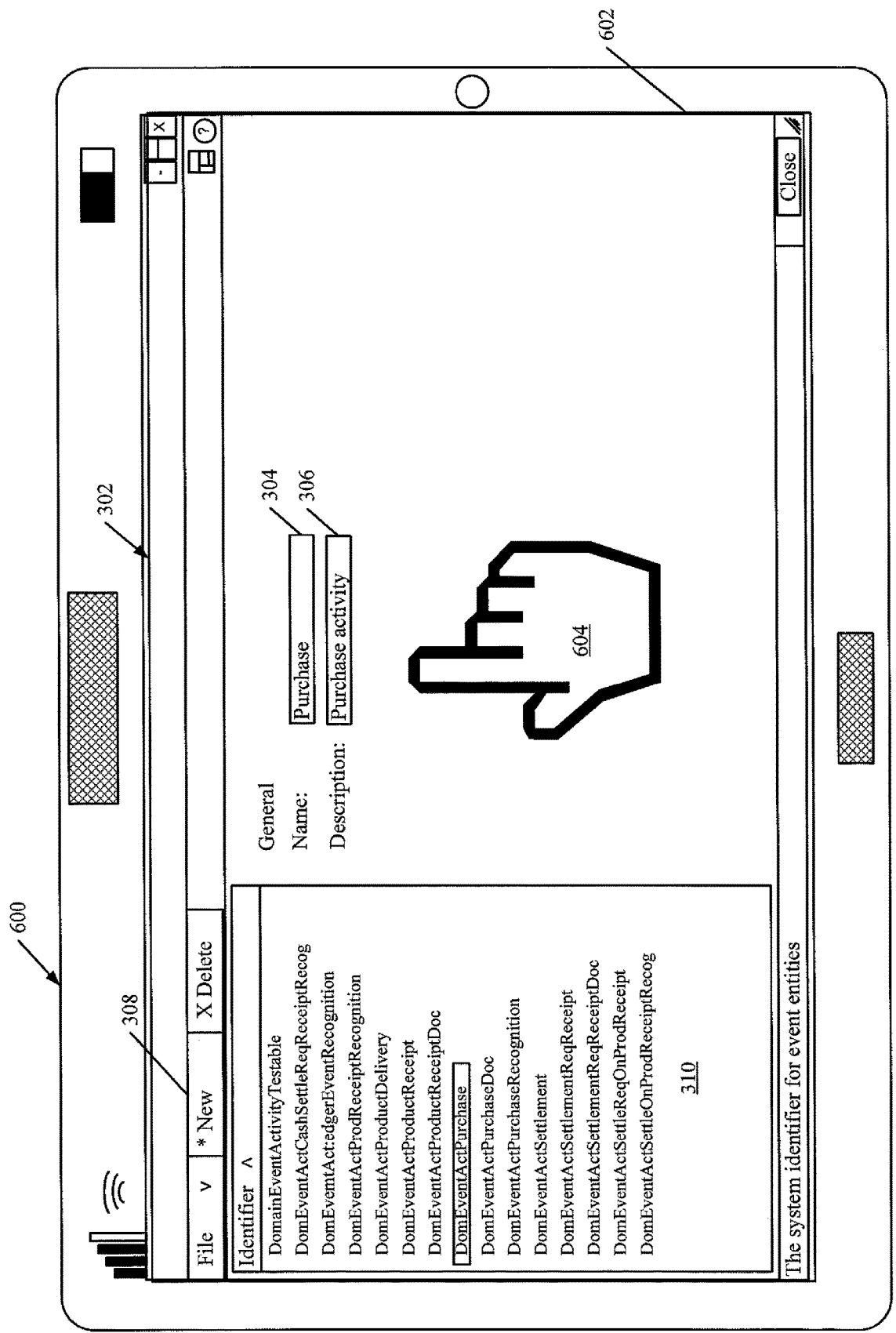

FIG. 8 shows one embodiment in which device 16 is a tablet computer 600. In FIG. 8, computer 600 is shown with user interface display 230 (from FIG. 4A) displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 9:
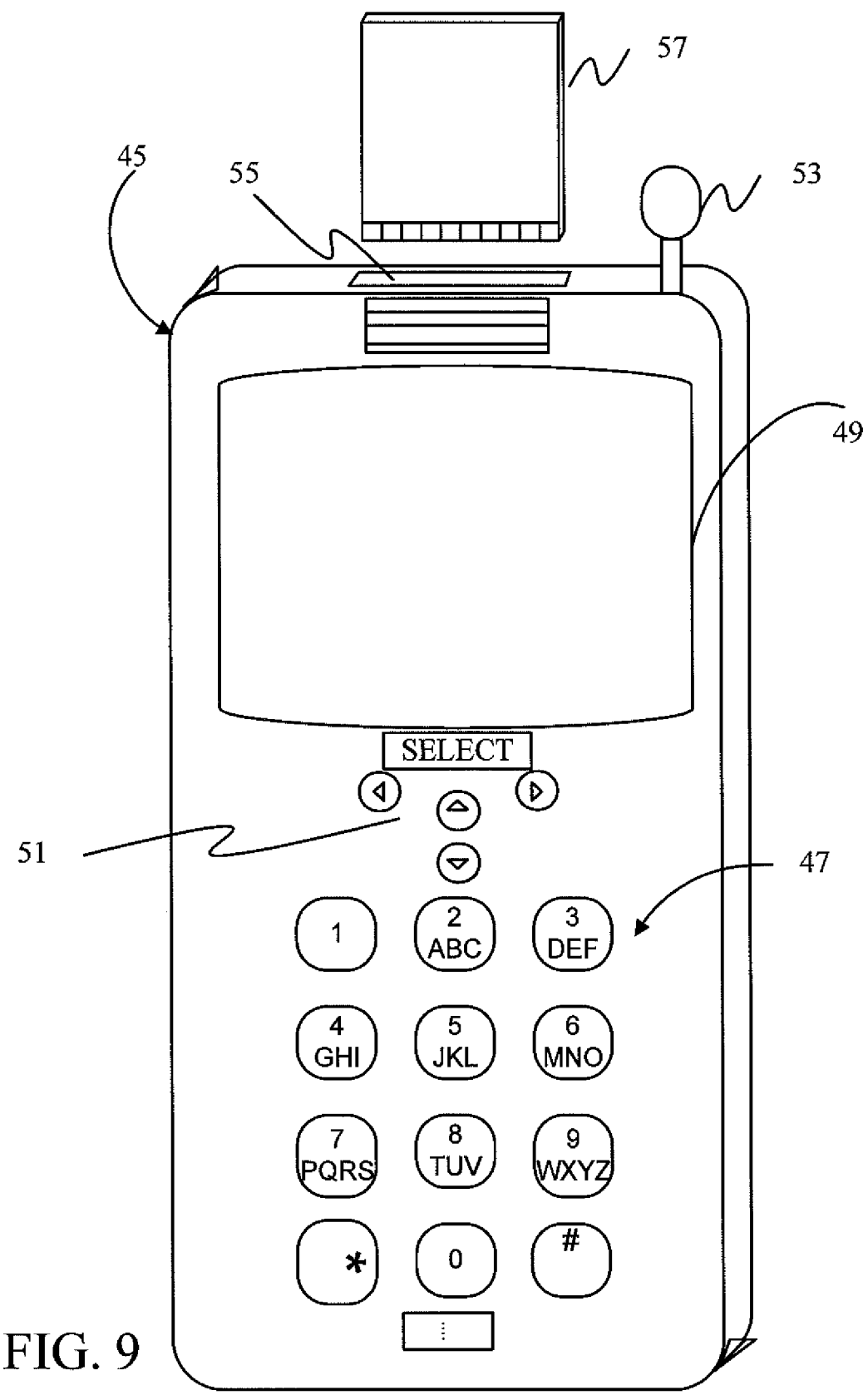
Figure 10:
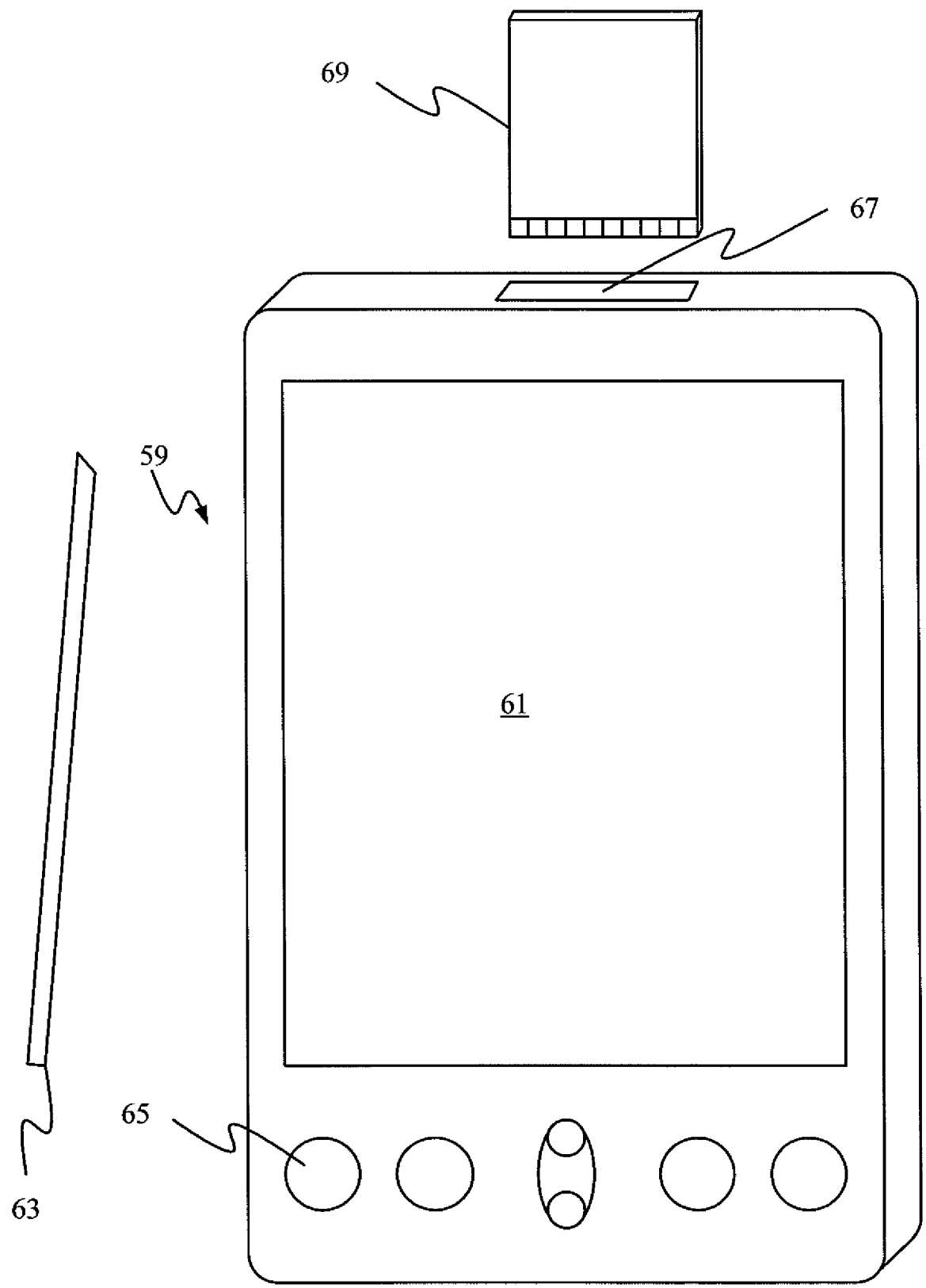

FIGS. 9 and 10 provide additional examples of devices 16 that can be used, although others can be used as well. In FIG. 9, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 10 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 11:
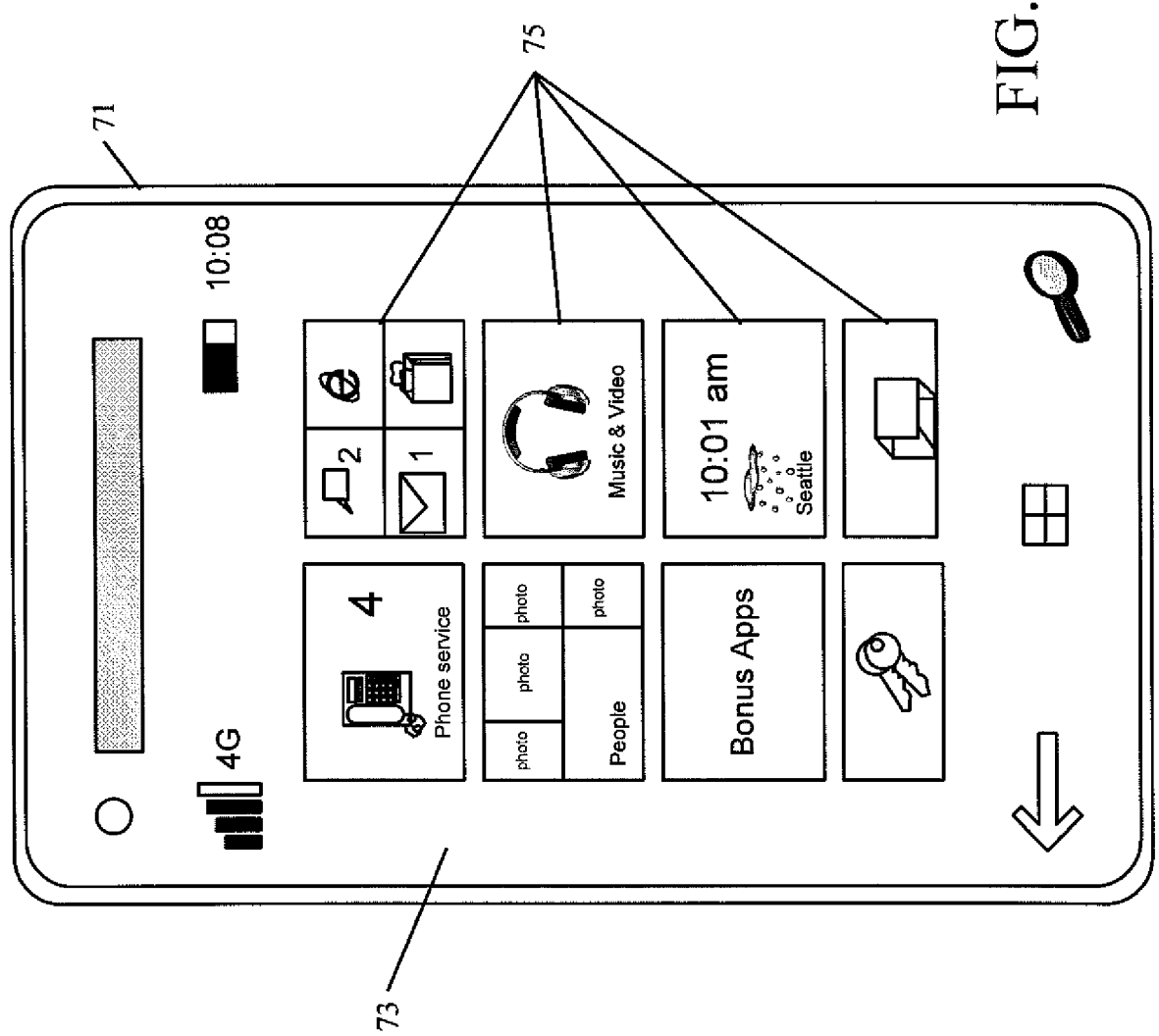

FIG. 11 is similar to FIG. 9 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
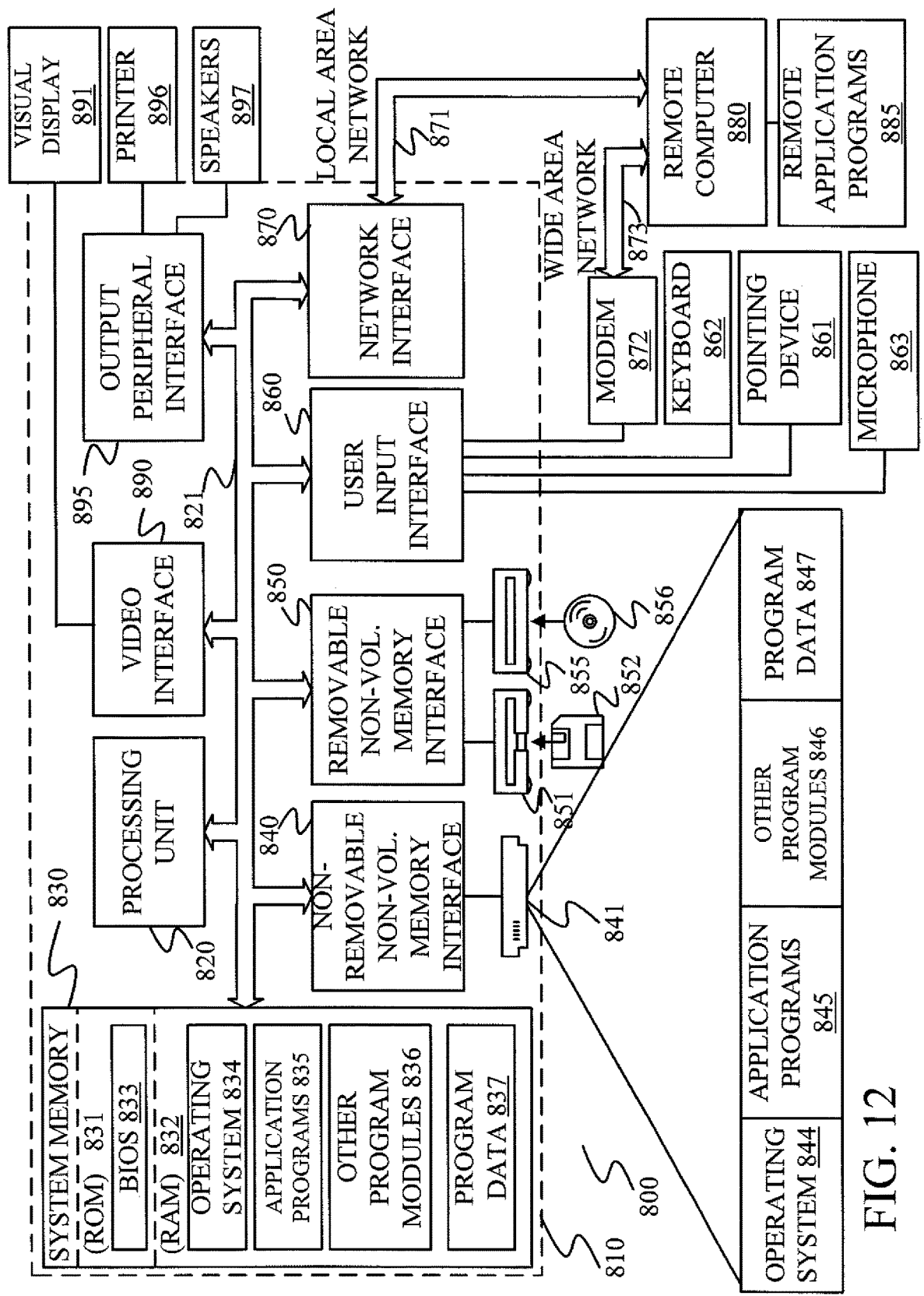
FIG. 12 shows a block diagram of one embodiment of a computing environment.

FIG. 12 is one embodiment of a computing environment in which architecture 100, or parts of it, (for example) can be deployed. With reference to FIG. 12, an exemplary system for implementing some embodiments includes a general-purpose computing device in the form of a computer 810. Components of computer 810 may include, but are not limited to, a processing unit 820 (which can comprise processor 140 or other processors), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving a type-checked compiled code representation of a set of data objects associated with an application, each data object being defined as a class and includes corresponding compiled code representation metadata that define properties of the data object,
   the compiled code representation metadata being generated by a compiler
   compiling application source code, and
   performing type checking to detect type errors;
   generating a relational representation of the set of data objects that stores relational representation metadata that is copied from the compiled code representation metadata;
   generating a user interface display that displays at least a portion of the relational representation and includes an object extension user input mechanism;
   based on an indication of user actuation of the object extension user input mechanism, modifying the relational representation metadata to define an extension to the set of data objects;
   based on an indication of a runtime execution request, comparing version information associated with the relational representation and the compiled code representation;
   based on the comparison, automatically performing a synchronization method that synchronizes the relational representation with the compiled code representation by:
   identifying additional metadata in the compiled code representation; and
   adding the additional metadata to the relational representation; and
   instructing a runtime environment to perform a runtime operation that:
   instantiates the set of data objects using the synchronized relational representation, and
   is independent of the compiled code representation of the set of data objects.

2. The computer-implemented method of claim 1, wherein the extension comprises at least one of:
   extend a data object in the set of data objects; or
   add a new data object to the set of data objects.

3. The computer-implemented method of claim 1 wherein the relational representation includes a field that corresponds to a property of the class.

4. The computer-implemented method of claim 1 wherein the runtime environment runs the set of data objects associated with the application without using the compiled code representation of the set of data objects.

5. The computer-implemented method of claim 4, wherein the synchronization method performs at least one of:
   inserting a row in the table based on the additional metadata; or
   updating a row in the table based on the additional metadata, and
   wherein the runtime environment performs the runtime operation by instantiating the set of data objects using the table.

6. The computer-implemented method of claim 5, wherein performing the synchronization method comprises:
   receiving a request from the runtime environment to access the relational representation;
   in response to receiving the runtime environment request, automatically calling a comparison method that compares a version number in the relational representation with the compiled code representation; and
   automatically calling a deployer method based on the comparison, wherein the deployer method deploys metadata between the compiled code representation and the relational representation when the comparison indicates that the version number of the relational representation and the compiled code representation do not represent the same version.

7. A computer system, comprising:
a computer processor; and
memory storing instructions executable by the computer processor, wherein the instructions configure the computer system to:
receive a type-checked compiled code representation of a set of data objects associated with an application, each data object being defined as a class and includes corresponding compiled code representation metadata that define object properties,
the compiled code representation metadata being generated by a compiler
compiling application source code, and
performing type checking to detect type errors;
generate a relational representation of the set of data objects that stores relational representation metadata that is copied from the compiled code representation metadata;
generate a user interface display that displays at least a portion of the relational representation and includes an object extension user input mechanism;
based on an indication of user actuation of the object extension input mechanism, modify the relational representation metadata to define an extension to the set of data objects;
automatically perform a synchronization method that synchronizes the relational representation with the compiled code representation by:
identifying additional metadata in the compiled code representation; and
adding the additional metadata to the relational representation; and
instruct a runtime environment to perform a runtime operation that
instantiates the set of data objects using the synchronized relational representation, and
is independent of the compiled code representation of the set of data objects.

8. The computer system of claim 7, wherein the instructions configure the computer system to:
based on an indication of a runtime execution request, compare version information associated with the relational representation and the compiled code representation;
based on the comparison, automatically perform the synchronization method.

9. The computer system of claim 8 wherein the instructions configure the computer system to:
compare versions of the compiled code representation and the relational representation.

10. The computer system of claim 9 wherein the instructions configure the computer system to automatically compare the versions each time the application engine accesses the set of data objects.

11. The computer system of claim 10 wherein the instructions configure the computer system to:
synchronize the compiled code representation with the relational representation, automatically, when the comparison indicates that the versions do not match.

12. A computer-implemented method, comprising:
obtaining source code that defines a set of data objects in a computing system, each data object being defined as a class that includes corresponding property metadata;
compiling, by a compiler that performs type-checking, the source code to generate a type-checked compiled code representation of the set of data objects;
generating a relational representation of the set of data objects that includes a field that stores metadata that is copied from the compiled code representation metadata and corresponds to the property metadata of the class;
generating a user interface display that displays at least a portion of the relational representation of the data object and includes an object extension user input mechanism;
based on an indication of user actuation of the object extension user input mechanism, modifying the relational representation metadata to define an extension to the one or more data objects;
automatically performing a synchronization method that synchronizes the relational representation with the compiled code representation by:
identifying additional metadata in the compiled code representation; and
adding the additional metadata to the relational representation; and
instructing a runtime environment to perform a runtime operation for the computing system, wherein the runtime operation:
instantiates the set of data objects using the synchronized relational representation, and
is independent of the compiled code representation of the set of data objects.

13. The computer-implemented method of claim 12 wherein the extension comprises at least one of:
extend a data object in the set of data objects; or
add a new data object to the set of data objects.

14. The computer-implemented method of claim 12, and further comprising:
based on an indication of a runtime execution request, comparing version information associated with the relational representation and the compiled code representation; and
based on the comparison, automatically performing the synchronization method.

15. The computer-implemented method of claim 14, wherein generating the relational representation comprises:
creating an abstract base class for the object having an object type; and
creating a table in a relational data store for the object, the table having one or more fields that store metadata corresponding to the metadata in the compiled code representation.

16. The computer-implemented method of claim 15, wherein generating the relational representation comprises:
generating a concrete class that derives from the abstract base class;
adding metadata to the one or more fields in the table for the concrete class; and
generating a method associated with the concrete class that returns a version number for the concrete class.

17. The computer-implemented method of claim 16, wherein generating the synchronization method comprises:
generating a comparison method that compares the version number of the concrete class in the relational representation of the object with the compiled code representation of the object and provides an output indicative of whether the version number of the concrete class and the compiled code representation represent a same version.

18. The computer-implemented method of claim 17, wherein generating the synchronization method comprises:
   generating a deployer method that deploys metadata between the compiled code representation of the object and the relational representation of the object when the output of the comparison method indicates that the version number of the concrete class and the compiled code representation do not represent the same version.

19. The computer-implemented method of claim 18, and further comprising:
   receiving an indication of a user extension input;
   based on the indication of the user extension input, performing at least one of:
      extending an object in the set of data objects; or
      adding a new object in the set of data objects; and
   automatically calling the deployer method in response to receiving the indication of the user extension input.

20. The computer-implemented method of claim 18, and further comprising:
   receiving a runtime environment request to access the relational representation of the object;
   in response to receiving the runtime environment request, automatically calling the comparison method; and
   automatically calling the deployer method based on the output of the comparison method.

* * * * *